Nov. 17, 1959    Z. L. LAPIN ET AL    2,913,035
MOUNTING DEVICE FOR TUBELESS TIRES
Filed Aug. 29, 1955
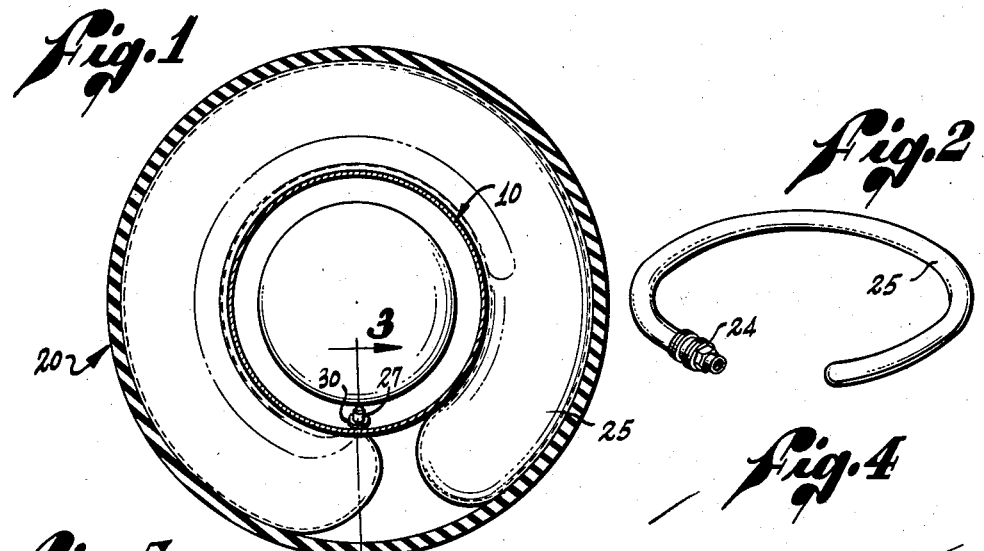
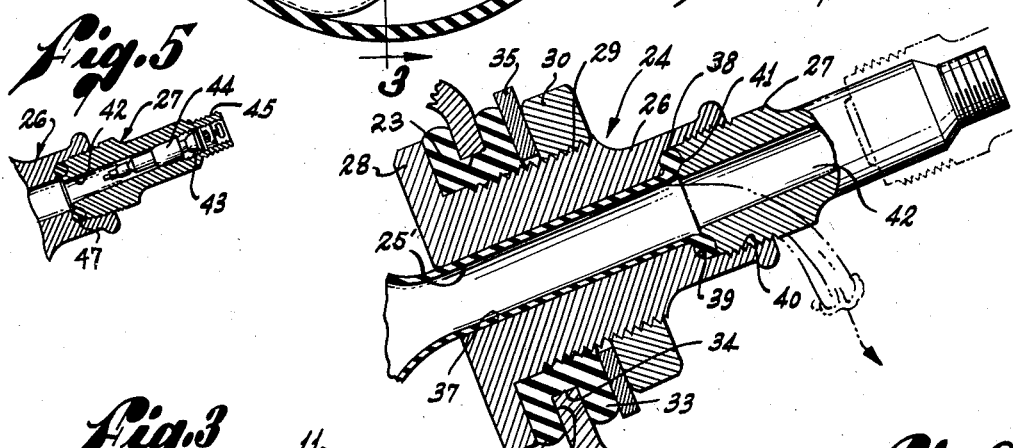
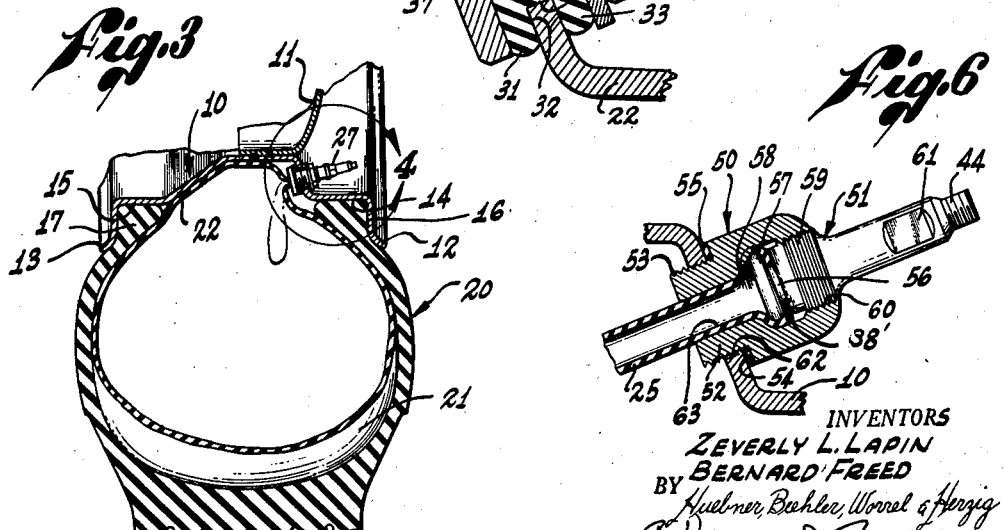
INVENTORS
ZEVERLY L. LAPIN
BERNARD FREED

United States Patent Office 2,913,035
Patented Nov. 17, 1959

2,913,035

MOUNTING DEVICE FOR TUBELESS TIRES

Zeverly L. Lapin and Bernard Freed, Los Angeles, Calif.

Application August 29, 1955, Serial No. 531,228

4 Claims. (Cl. 152—415)

The invention relates to the art of mounting tubeless tires on rims prepared for them and has particular reference to a device including a valve and a temporary tube by means of which the tire can be expanded so that it is sealed to the rim, after which it is in condition for inflation in the usual manner.

A great deal of attention has been given in recent months to employment of tubeless tires. The commercial form of tubeless tire differs very little from the well-known exterior casing of a tire except that the bead around the usual opening of the casing is formed so that it snugly engages the flange on the rim of the wheel tight enough so that the casing in effect can be inflated and hold its inflated condition without employment of an inner tube.

Although tubeless tires have been very successful in use, the very nature of the casing which comprises the tubeless tire is such that it presents a very serious problem in applying it to the rim. The well-known exterior casing is of very heavy multiple-ply material consisting of several layers of woven fabric laminated with a corresponding number of layers of tough rubber on the exterior of which is a thick layer of tread. The bead of the casing which engages the flange on the rim is of particularly heavy construction and often reinforced with wire.

A variety of expedients have heretofore been resorted to for sealing the tubeless tire to the rim. Although many mounting means developed for mounting conventional tire casings on a rim are adaptable to the mounting of tubeless tires, such conventional and previously known means do not provide any mechanism by which the bead on the casing is forced against the flange. In the mounting of conventional tires this is accomplished when the conventional inner tube is inflated.

A common expedient which has been employed for the mounting of tubeless tires has been to place some appropriate metal band around the outermost circumference of the casing and gradually squeeze the band to deform the casing at the thread portion, the deformation being depended upon to gradually force the bead portion of the casing against the flange. Tubeless tire casings are so resistant to deformation that great force has to be exerted in order to deform it sufficiently to engage the flange. When force is applied there is a resilient resistance to it of such strength that if the deforming tool happens to slip off the circumference of the casing, it will spring back and in fact many times becomes a dangerous weapon, doing damage to the operator. The tools furthermore must be applied with considerable care and for that reason are time-consuming in their use. The ordinary cumbersome mechanics of such deforming tools furthermore require an unnecessarily long time to apply them in a safe fashion and with sufficient effectiveness to make sure that the tubeless tire casing properly seals itself upon the rim of the wheel.

It is therefore among the objects of the invention to provide a new and improved device for quickly and effectively mounting a tubeless tire in proper position upon the rim.

Another object of the invention is to provide a new and improved means for mounting tubeless tires which is safe in its operation and which is particularly easy to employ.

Still another object of the invention is to provide a new and improved mounting means for tubeless tires which is certain in its operation and which needs no special tools or in fact any tools in order to have it be employed in an effective fashion.

Still another object of the invention is to provide a new and improved device for the application of tubeless tires to a rim which is sufficiently simple to manipulate that the tires can be applied on the road should a puncture occur or in fact anywhere, the device furthermore being of such construction that no appreciable change is needed from standard equipment except the provision of a valve assembly which is part of the novel device but which is so constructed that it can be conveniently applied at the usual location on the rim of the wheel.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a longitudinal sectional view of the device in use in a tubeless tire.

Figure 2 is a perspective view of the device prior to inflation in use.

Figure 3 is a cross-sectional view taken on the line 3—3 of Figure 1.

Figure 4 is a longitudinal sectional view of one form of the valve assembly.

Figure 5 is a fragmentary longitudinal view of the outer portion of the device of Figure 4 showing a conventional check valve.

Figure 6 is a longitudinal sectional view of one modified form of the device.

In an embodiment of the invention chosen for the purpose of illustration there is shown a conventional rim 10 shown mounted upon a wheel 11, a fragment of which is illustrated in Figure 3. The rim 10 is provided with outer and inner flanges 12 and 13, respectively, forming recesses 14 and 15 for reception of beads 16 and 17.

The tubeless tire indicated generally by the reference character 20 is in the customary conventional form and has in all general respects the appearance of the usual tire casing but is used without an inner tube. Inside of the tire is a chamber 21 which contains the air with which the tire is inflated. It will be noted further that an inner portion 22 of the rim 10 forms a part of the wall of chamber 21 when the tire is assembled on the rim.

At one point on the outer flange 12 there is provided an aperture 23 for reception of a valve assembly 24. Attached to the valve assembly is a flexible inflatable sack or elongated tube 25 which is the means by which the tubeless tire is distended so that the beads 16 and 17 are forced into sealing contact with the respective flanges 12 and 13.

In one form of the invention the valve assembly is constructed of essentially two parts, namely, an inner valve member 26 and an outer valve member 27.

In the form of the device of Figures 4 and 5 the inner valve member is provided with an inner annular flange 28, an exteriorly threaded body 29, and a nut 30 threadedly engageable with the body. When the valve assembly is to be mounted upon the rim 10 at the outside face of the inner portion 22, there is provided a resilient grommet 31 in which is an annular recess 32 adapted to receive an edge 34 of the aperture 23 in the rim. The grommet extends over both outside and inside faces of the rim and is forced into sealing relationship by assistance of a washer 35 when the nut 30 is screwed into place. In this fashion the inner valve member is sealed in position upon the rim of the wheel.

Ordinarily it is contemplated that the valve assembly will be initially provided with the sac 25. For securing the sac 25 to the valve assembly the sac has formed thereon a neck 25' which may if preferred be of material somewhat denser and less expansive than the remaining portion of the sac. The neck extends through an inner valve passage 37 in the inner valve member 26 and has around its opened end a ring or bead 38. To mount and seat the ring a dished annular recess 39 is provided in a threaded aperture 40.

To firmly hold the ring 38 in sealed position the outer valve member 27 has provided at its inner end an annular recess 41 formed to engage the ring when the outer valve member 27 is threadedly engaged with the aperture 40 of the inner valve member.

As illustrated in Figure 5 the outer valve member has an outer valve passage 42 extending therethrough and in alignment with the inner valve passage 37. At the outer end of the outer valve passage there is provided the customary interiorly threaded section 43 which is adapted to receive the well-known check valve element 44, this being the element long in use on inner tubes. The outer valve member may be provided with exterior threads 45 adapted to receive a fitting 46 at the end of a pump hose.

In use of the form of the invention just described the inner valve member 24 is first mounted in place. The sac is then positioned in the valve passage of the inner valve member and the ring 38 sealed by application of the outer valve member 27 to the inner valve member. The tubeless tire or casing 20 is applied in the customary fashion by the use of acceptable tools. With the outside wall of the tire 20 exposed to view, i.e., the valve aperture side, the tire wall is depressed by hand so that the sac may be laid around the circumference of the rim to the extent of its length and within the flange. With the parts thus positioned the sac 25 is inflated by applying pressure through the valve passages and the sac will expand and extend to a position substantially filling the chamber 21 and the continued expansion will force the beads 16 and 17 outwardly into sealing engagement with the respective flanges of the rim. Once the tubeless tire has been properly positioned, the outer valve member 27 is removed and the sac 25 is permitted to deflate and when in deflated condition is pulled out through the valve passage 37 of the inner valve member. The outer valve member 27 is then replaced by being threaded into the same threaded aperture 40. If need be, a sealing gasket 47 can be employed to replace the ring 38. The outer and inner valve members at this point comprise what is more or less functionally a regular tire inflating valve and the valve assembly in the last described condition will comprise a permanent installation by means of which the tubeless tire can be finally inflated to the desired pressure.

It is understood that the sac 25 may be of very thin walled material, care being taken only that it be long enough and expandable to a degree sufficient to completely fill the interior of the tubeless tire under sufficient pressure to force it into proper position. If wheel balancing is not important, the sac may even be inflated to a point where it will fracture and then be left in the chamber 21 after the tubeless tire has been inflated in the usual fashion to a desired pressure.

Moreover, as air is induced into the air sac, the sac can expand sufficiently to force the beads of the tire against the rim flanges. Air pressure may be applied without interruption until the pressure bursts the sac causing the immediate sealing of the beads against the rim flanges by the impact burst of air from the air sac against the tire walls. The air sac may then be left in or removed, as previously indicated.

In the form of the device illustrated in Figure 6 the sac 25 is again employed although it may be advisable to modify to a degree the edges of the open end by provision of a somewhat flat annular edge portion or bead 38'.

A valve assembly in the form of Figure 6 comprises an inner valve member 50 of preferably hexagonal exterior shape and an outer valve member 51. The outer valve member is shown in the form of Figure 6 as including an integrally formed bushing 52 on the exterior of which are self-cutting threads 53. The inner valve member can be secured to the rim 10 in sealed relation therewith by application of the self-cutting threads until a shoulder 54 bears against a packing washer 55 with sufficient force to effect a seal.

Ordinarily the outer valve member 54 may be initially assembled with the inner valve member 50 and the sac 25. In assembled relationship the bead 38' which may be of very small diameter when contracted engages in a curved annular recess 56. A smooth-surfaced ring 57 of the material of the outer valve member forms one side of the recess 56, the same ring 57 also being adapted to serve as a means of compressing a neck section 58 of the sac so as to effect a more positive seal. A threaded collar 59 of the outer valve member threadedly engages an appropriate threaded recess 60, thereby permitting the outer valve member to be securely fastened to the inner valve members. A wrench hold 61 of some suitable configuration is helpful in inserting and removing the outer valve member from the inner valve member. It is also helpful to provide the inner valve member with an exterior form of such nature that it can be readily grasped by a wrench when applied and also held by similar means when the outer valve member is employed and removed. The outer valve member in the form of the device of Figure 6 is fitted with the customary check valve element 44 already described in connection with the form of the device of Figures 4 and 5.

In the use of the form of Figure 6 of the invention the entire valve assembly may be applied from the outside of the rim. When applied the sac can be inserted through a hole 62 in the rim 10 through which the inner valve member will be ultimately inserted. Since the hole 62 is quite large, it will be easy to extend the sac into the chamber 21.

After the valve assembly has been tightened into position, the sac is inflated in the same fashion as previously described and placed under such pressure that the walls of the sac will expand into engagement with the interior walls of the chamber within the tubeless tire, thereby to force the beads into their desired position against the flanges. The outer valve member 51 is then removed and inasmuch as the sac is actually fastened to the outer valve member, it will be drawn outwardly through a valve passage 63 of the inner valve member, after allowing the air to escape therefrom, and can thereafter be discarded. After the sac has been removed from the outer valve member, it can be replaced with or without the addition of a sealing washer and the valve assembly thus formed can be employed to inflate the tubeless tire in the usual fashion.

There has accordingly been described herein a simple and effective means for employing air pressure to force the tubeless tire structure into realing relationship with the rim on the wheel. The sac, by means of which pressure is contained until the work is done, may be made of light-weight, fragile and inexpensive material of any number of acceptable kinds. This may take the form of a rubber or plastic balloon-like sac or may even take the form of a still more fragile material such as an acceptable type of paper. It is important only that the sac be one capable of expansion to a point where air under pressure in the sac will be contained long enough to force the tubeless tire into position whereupon the sac may be withdrawn or disposed of by any acceptable means and the wall of the tubeless tire thereafter depended upon to contain the pressure which the tire must have when in use.

While we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent devices.

Having described our invention, what we claim as new and desire to secure by Letters Patent is:

1. A valve assembly for wheel rims adapted to seat a tubeless tire thereon and provided with a valve aperture therein, said valve assembly comprising a rim-engaging part adapted to be mounted in the rim valve aperture and having an air passageway therethrough opening to the rim interior, an air supply engaging part having an air passageway therethrough, and an elongated tubular sac having an open end and a closed end, means securing the two said parts together with the air passageways therein in communication and with the open end of the said sac mounted in closure position across the said passageway intermediate its opposite open ends and with the closed end thereof extending out of the rim engaging part to the rim interior, a check valve admitting air under pressure mounted in the open end of the passageway in the air supply engaging part, said sac being comprised of flexible inflatable material and having a length approximating the circumference of the rim on which the valve assembly is to be mounted.

2. Means for securing a tubeless tire upon a rim, said means comprising a valve assembly consisting of two separable parts having aligned air passageways therethrough, means on one end of the valve assembly to secure the assembly in closure position in a valve aperture in the rim interior, a check valve closing the other end of said passageway, said check valve passing air under pressure into the passageway and preventing the passage of air therethrough out of the passageway, and an elongated tubular sac having an open end and a closed end removably mounted in said passageway with the open end thereof secured in closure position thereacross and with the length thereof extending in the direction of air intake through the valve assembly to the interior of the rim and along substantially the entire inner circumference of the rim, said sac being comprised of a flexible and expansible rubber composition.

3. A valve assembly for rims adapted to seat tubeless tires thereon and provided with a valve assembly aperture therein, said valve assembly consisting of two separable parts having communicating air passageways therethrough, means for removably securing one of the parts in closure position, in the rim aperture with the other said part extending outwardly therefrom and the air passageways therethrough opening to the rim interior, a check valve closing the outer end of said passageways, said valve permitting the passage of air under pressure through the passageway to the rim interior but checking the passage of air in a reverse direction, and an elongated tubular sac comprised of flexible expansible material, said sac having a closed end and an open end, means securing the open end of said sac in closure position across said passageway between the valved inlet and open outlet ends thereof with the length thereof extending out of the open end thereof, said length being approximately that equal to the circumference of the rim on which the valve assembly is to be mounted.

4. The valve assembly of claim 3, said tubular sac being provided on its open end thereof with an annular ring and the abutting faces of the two said parts being provided with annular recesses about the peripheries of the abutting air passageways therein, said recesses being adapted to receive and seat said annular ring therein to secure the tubular sac in position therebetween.

References Cited in the file of this patent

UNITED STATES PATENTS

| | | |
|---|---|---|
| 1,080,814 | Dreger et al. | Dec. 9, 1913 |
| 1,596,852 | Foster | Aug. 17, 1926 |
| 2,054,965 | Clo | Sept. 22, 1936 |
| 2,222,047 | Snyder | Nov. 19, 1940 |
| 2,399,572 | Powell et al. | Apr. 30, 1946 |
| 2,406,628 | Patchen | Aug. 27, 1946 |
| 2,540,403 | Meyers | Feb. 6, 1951 |
| 2,552,336 | Marcum | May 8, 1951 |

FOREIGN PATENTS

| | | |
|---|---|---|
| 200,623 | Australia | Mar. 17, 1955 |